US011446963B2

(12) United States Patent
Tanabe et al.

(10) Patent No.: US 11,446,963 B2
(45) Date of Patent: Sep. 20, 2022

(54) TYRE

(71) Applicant: Sumitomo Rubber Industries, Ltd., Hyogo (JP)

(72) Inventors: Maiko Tanabe, Kobe (JP); Ryo Oba, Kobe (JP); Tetsuya Maekawa, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 330 days.

(21) Appl. No.: 16/571,317

(22) Filed: Sep. 16, 2019

(65) Prior Publication Data
US 2020/0114696 A1   Apr. 16, 2020

(30) Foreign Application Priority Data

Oct. 12, 2018 (JP) .............................. JP2018-193641
Oct. 12, 2018 (JP) .............................. JP2018-193642
Oct. 12, 2018 (JP) .............................. JP2018-193643

(51) Int. Cl.
*B60C 11/03* (2006.01)
*B60C 11/12* (2006.01)
*B60C 11/13* (2006.01)

(52) U.S. Cl.
CPC ...... *B60C 11/1204* (2013.01); *B60C 11/0304* (2013.01); *B60C 11/1236* (2013.01);
(Continued)

(58) Field of Classification Search
CPC ............ B60C 11/0304; B60C 11/1236; B60C 11/1392; B60C 2011/1254;
(Continued)

(56) References Cited

U.S. PATENT DOCUMENTS

2010/0139826 A1* 6/2010 Matsumoto ......... B60C 11/0304
152/209.18
2010/0212792 A1   8/2010 Mita
(Continued)

FOREIGN PATENT DOCUMENTS

EP   2151333 A1   2/2010
EP   3318421 A1   5/2018
(Continued)

OTHER PUBLICATIONS

The extended European search report issued by the European Patent Office dated Feb. 12, 2020, which corresponds to European Patent Application No. 19197535.8-1012 and is related to U.S. Appl. No. 16/571,317.

*Primary Examiner* — Katelyn W Smith
*Assistant Examiner* — Brendon Charles Darby
(74) *Attorney, Agent, or Firm* — Studebaker & Brackett PC

(57) ABSTRACT

A tyre includes a tread portion including a first middle land portion, a second middle land portion, a first shoulder land portion, and a second shoulder land portion. The first middle land portion is provided with first middle lateral grooves terminating within the first middle land portion, the second middle land portion is provided with second middle lateral grooves terminating within the second middle land portion, the first shoulder land portion is provided with first shoulder lateral grooves, and the second shoulder land portion is provided with second shoulder lateral grooves. The first middle lateral grooves and the second middle lateral grooves are inclined in a first direction with respect to the tyre axial direction, and the first shoulder lateral grooves and the second shoulder lateral grooves are inclined in a second direction opposite to the first direction with respect to the tyre axial direction.

18 Claims, 10 Drawing Sheets

(52) U.S. Cl.
CPC ... *B60C 11/1392* (2013.01); *B60C 2011/0334* (2013.01); *B60C 2011/0341* (2013.01); *B60C 2011/0358* (2013.01); *B60C 2011/0372* (2013.01); *B60C 2011/0381* (2013.01); *B60C 2011/0383* (2013.01); *B60C 2011/1254* (2013.01)

(58) Field of Classification Search
CPC ..... B60C 2011/0381; B60C 2011/0383; B60C 2011/0372; B60C 2011/0334
See application file for complete search history.

(56) References Cited

U.S. PATENT DOCUMENTS

| | | | |
|---|---|---|---|
| 2015/0210121 A1 | 7/2015 | Sanae | |
| 2016/0303919 A1* | 10/2016 | Yamaoka | B60C 11/1392 |
| 2017/0050470 A1* | 2/2017 | Kanematsu | B60C 11/0304 |
| 2017/0210175 A1* | 7/2017 | Yoshimura | B60C 11/0309 |
| 2017/0368882 A1 | 12/2017 | Mukai et al. | |
| 2019/0152269 A1* | 5/2019 | Kanamura | B60C 11/0304 |

FOREIGN PATENT DOCUMENTS

| | | |
|---|---|---|
| JP | 2013-018309 A | 1/2013 |
| JP | 2015-140047 A | 8/2015 |
| JP | 2017-226366 A | 12/2017 |

\* cited by examiner

TYRE

BACKGROUND ART

Field of the Disclosure

The present disclosure relates tyres, more particularly to a tyre including a tread portion having a designated mounting direction to a vehicle.

Description of the Related Art

Conventionally, various tyres which include a tread portion having a mounting direction to a vehicle have been proposed (referring to the following patent document 1).

PATENT DOCUMENT

[Patent document 1] Japanese Unexamined Patent Application Publication 2015-140047

SUMMARY OF THE DISCLOSURE

In tyres which are supposed to be used on both dry and snowy road conditions, lateral grooves provided on tread portions are helpful to improve on-snow performance, but provide low tread pattern stiffness, resulting in deteriorating steering stability on dry road condition. The inventors, through various experiments, have solved the above problem in tyres including a tread portion having a designated mounting direction to a vehicle by modifying layout of lateral grooves.

The present disclosure has been made in view of the above problem and has a major object to provide tyres capable of improving steering stability on dry road conditions as well as on-snow performance.

According to one aspect of the disclosure, a tyre includes a tread portion having a designated mounting direction to a vehicle. The tread portion includes a first tread edge located inwardly of a vehicle when being mounted to the vehicle, a second tread edge located outwardly of a vehicle when being mounted to the vehicle, circumferentially and continuously extending main grooves arranged between the first tread edge and the second tread edge, the main grooves including a first shoulder main groove arranged between the first tread edge and a tyre equator, a second shoulder main groove arranged between the second tread edge and the tyre equator, and at least one crown main groove arranged between the first shoulder main groove and the second shoulder main groove, and land portions divided by the main grooves, the land portions including a first middle land portion defined between the first shoulder main groove and the at least one crown main groove, a second middle land portion defined between the second shoulder main groove and the at least one crown main groove, a first shoulder land portion defined between the first shoulder main groove and the first tread edge, and a second shoulder land portion defined between the second shoulder main groove and the second tread edge. The first middle land portion is provided with first middle lateral grooves extending from the first shoulder main groove and terminating within the first middle land portion. The second middle land portion is provided with second middle lateral grooves extending from the at least one crown main groove and terminating within the second middle land portion. The first shoulder land portion is provided with first shoulder lateral grooves extending in a tyre axial direction. The second shoulder land portion is provided with second shoulder lateral grooves extending in the tyre axial direction. The first middle lateral grooves and the second middle lateral grooves are inclined in a first direction with respect to the tyre axial direction. The first shoulder lateral grooves and the second shoulder lateral grooves are inclined in a second direction opposite to the first direction with respect to the tyre axial direction.

In another aspect of the present disclosure, lengths in the tyre axial direction of the second middle lateral grooves may be smaller than lengths in the tyre axial direction of the first middle lateral grooves.

In another aspect of the present disclosure, lengths in the tyre axial direction of the first middle lateral grooves may be in a range of from 0.70 to 0.90 times a width in the tyre axial direction of the first middle land portion.

In another aspect of the present disclosure, lengths in the tyre axial direction of the second middle lateral grooves may be in a range of from 0.40 to 0.60 times a width in the tyre axial direction of the second middle land portion.

In another aspect of the present disclosure, a width in the tyre axial direction of the first shoulder land portion may be in a range of from 1.10 to 1.40 times a width in the tyre axial direction of the first middle land portion.

In another aspect of the present disclosure, the first Middle lateral grooves, the second middle lateral grooves, the first shoulder lateral grooves and the second shoulder lateral grooves may be inclined at angles equal to or less than 45 degrees with respect to the tyre axial direction.

In another aspect of the present disclosure, the first middle land portion may not be provided with any grooves that are in communication with the at least one crown main groove directly and that have groove widths equal to or more than 1.5 mm.

In another aspect of the present disclosure, the second middle land portion may not be provided with any grooves that are in communication with the second shoulder main groove directly and that have groove widths equal to or more than 1.5 mm.

In another aspect of the present disclosure, the first shoulder lateral grooves may traverse the first shoulder land portion completely, and the second shoulder lateral grooves may traverse the second shoulder land portion completely.

In another aspect of the present disclosure, the second middle land portion may be provided with semi-open middle sipes extending from the at least one crown main groove and terminating within the second middle land portion.

In another aspect of the present disclosure, the first middle land portion may be provided with open middle sipes extending from the first shoulder main groove to the at least one crown main groove.

In another aspect of the present disclosure, the first shoulder land portion may be provided with first shoulder sipes extending outwardly in the tyre axial direction from the first shoulder main groove.

In another aspect of the present disclosure, the second shoulder land portion may be provided with second shoulder sipes having both ends terminating within the second shoulder land portion.

In another aspect of the present disclosure, stiffness in the tyre circumferential direction of the second middle land portion may be greater than stiffness in the tyre circumferential direction of the first middle land portion.

In another aspect of the present disclosure, stiffness in the tyre circumferential direction of the second shoulder land portion may be greater than stiffness in the tyre circumferential direction of the first shoulder land portion.

In another aspect of the present disclosure, the first middle land portion may be provided with first middle chamfered portions which are recessed on a corner portion between a ground contact surface of the first middle land portion and a land sidewall on the first shoulder main groove side, the first middle chamfered portions may be connected to the respective first middle lateral grooves, the first shoulder lateral grooves may extend from the first shoulder main groove, the first shoulder land portion may be provided with first shoulder chamfered portions which are recessed on a corner portion between a ground contact surface of the first shoulder land portion and a land sidewall on the first shoulder main groove side, the first shoulder chamfered portions may be connected to the respective first shoulder lateral grooves, and at least one of the first middle chamfered portions, at least partially, may face either one of the first shoulder chamfered portions in the tyre axial direction.

In another aspect of the present disclosure, the first middle chamfered portions may be connected to the respective first middle lateral grooves on a first side in the tyre circumferential direction, and the first shoulder chamfered portions may be connected to the first shoulder lateral grooves on a second side in the tyre circumferential direction.

In another aspect of the present disclosure, a maximum angle of the first middle lateral grooves with respect to the tyre axial direction may be greater than a maximum angle of the first shoulder lateral grooves with respect to the tyre axial direction.

In another aspect of the present disclosure, the first middle chamfered portions may include primary first middle chamfered portions which face the first shoulder chamfered portions and secondary first middle chamfered portions which do not face the first shoulder chamfered portions, and the primary first middle chamfered portions and the second first middle chamfered portions may be arranged alternately in the tyre circumferential direction.

In another aspect of the present disclosure, the first shoulder lateral grooves may include some first shoulder lateral grooves which are connected to the first shoulder chamfered portions and some first shoulder lateral grooves which are not connected to the first shoulder chamfered portions, and which are arranged alternately in the tyre circumferential direction.

DESCRIPTION OF THE PREFERRED EMBODIMENTS

Figure 1:
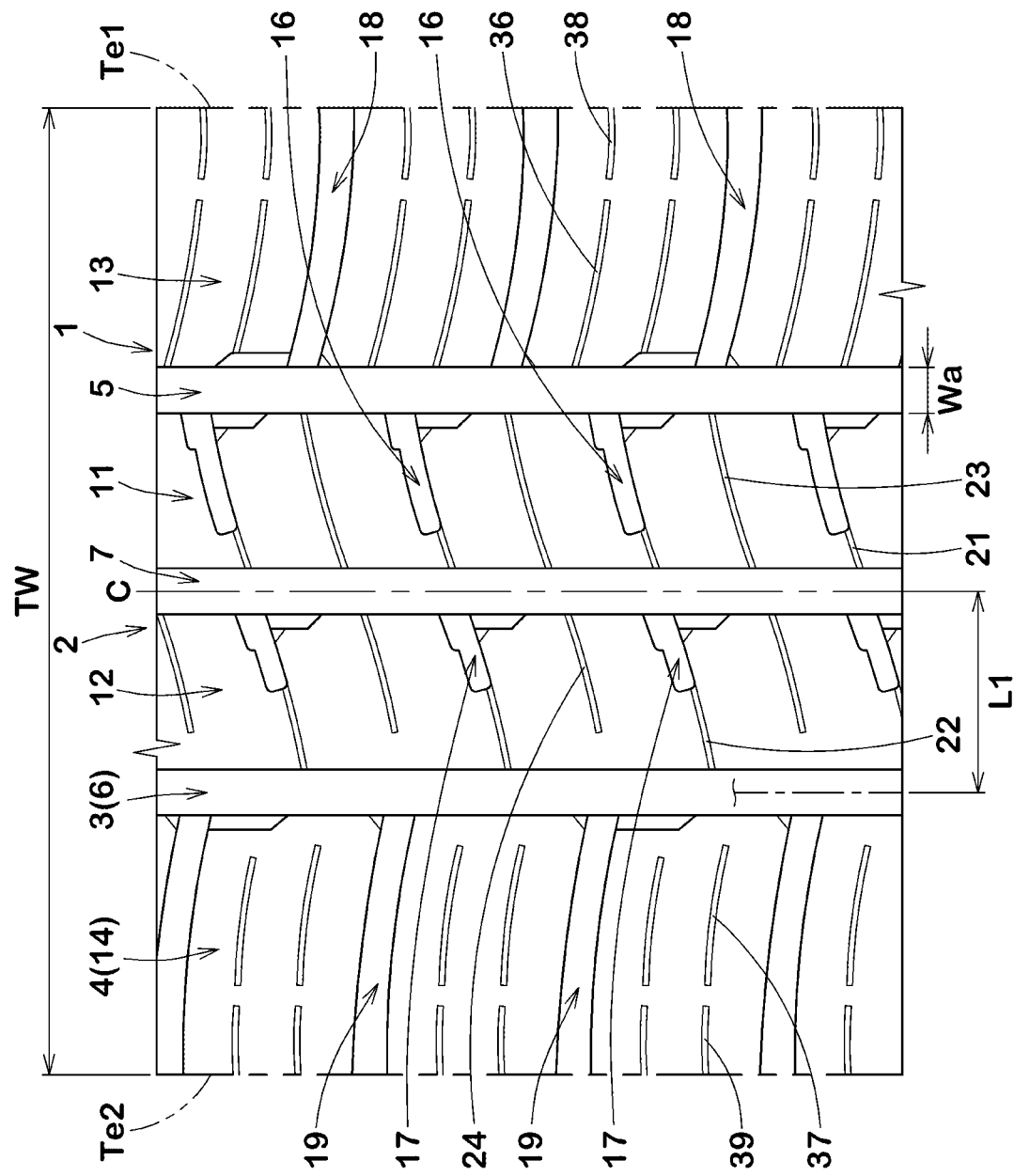
FIG. 1 is a development view of a tread portion of a tyre in accordance with an embodiment of the present disclosure.

An embodiment of the present disclosure will be explained below with reference to the accompanying drawings. FIG. 1 illustrates a development view of a tread portion 2 of a tyre 1 according to an embodiment of the present disclosure. The tyre 1 according to the present embodiment, for example, is suitably embodied as a pneumatic tyre for passenger car. Note that the present disclosure is not limited to such an aspect but can be embodied as a pneumatic tyre for heavy-duty vehicle and a non-pneumatic tyre which is not inflated with a pressurized air.

As illustrated in FIG. 1, the tyre 1 according to the present disclosure includes the tread portion 2 having a designated mounting direction to a vehicle. The tread portion 2 includes a first tread edge Te1 located inwardly of a vehicle when being mounted to the vehicle and a second tread edge Te2 located outwardly of a vehicle when being mounted to the vehicle. The mounting direction to a vehicle, for example, may be indicated using letters or a mark on a tyre sidewall portion (not illustrated).

When the tyre 1 is a pneumatic tyre, the first tread edge Te1 and the second tread edge Te2 are defined as axially outermost edges of the ground contacting patch of the tread portion 2 which occurs under a normal state with a standard tyre load when the camber angle of the tyre is zero. As used herein, the normal state is such that the tyre is mounted on a standard wheel rim with a standard pressure but loaded with no tyre load. As used herein, unless otherwise noted, dimensions of respective portions of the tyre are values measured under the normal state.

The standard wheel rim is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre is based, wherein the standard pressure is the "maximum air pressure" in JATMA the maximum pressure given in the "Tire Load Limits at Various Cold Inflation Pressures" table in TRA, and the "Inflation Pressure" in ETRTO, for example.

The standard tyre load is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

The tread portion 2 includes a plurality of continuously extending main grooves 3 in the tyre circumferential direction arranged between the first tread edge Te1 and the second tread edge Te2, and a plurality of land portions 4 divided by the main grooves 3.

The main grooves 3 include a first shoulder main groove 5 arranged between the first tread edge Te1 and the tyre equator C, a second shoulder main groove 6 arranged between the second tread edge Te2 and the tyre equator C, and at least one crown main groove 7 arranged between the first shoulder main groove 5 and the second shoulder main groove 6.

It is preferable that distances L1 in the tyre axial direction from the tyre equator C to a respective one of groove centerlines of the first shoulder main groove 5 and the second shoulder main groove 6, for example, are in a range of from 0.15 to 0.30 times the tread width TW. The tread width TW is an axial distance from the first tread edge Te1 to the second tread edge Te2 under the normal state.

As the at least one crown main groove 7, a single crown main groove 7 is arranged on the tyre equator C, for example. In another aspect, two crown main grooves 7 may be provided such that the tyre equator C is located therebetween, for example.

The main grooves 3 according to the present disclosure, for example, extend straight in parallel with the tyre circumferential direction. Alternatively, the main grooves 3, for example, extend in a wavy or zigzag manner.

It is preferable that groove widths Wa of the main grooves 3, for example, are in a range of from 3.0% to 6.0% of the tread width TW. It is preferable that groove depths of the main grooves 3, for example, are in a range of from 5 to 10 mm for a pneumatic tyre for passenger car.

The land portions 4 include a first middle land portion 11, a second middle land portion 12, a first shoulder land portion 13, and a second shoulder land portion 14. The tread portion 2 according to the present embodiment is configured as a four-rib pattern which has four land portions 4 and three main grooves 3. In another aspect of the present disclosure, for example, the tread portion 2 may be configured as five land portions with two crown main grooves 7.

The first middle land portion 11 is defined between the first shoulder main groove 5 and the crown main groove 7. The second middle land portion 12 is defined between the second shoulder main groove 6 and the crown main groove 7. The first shoulder land portion 13 is defined between the first shoulder main groove 5 and the first tread edge Te1. The second shoulder land portion 14 is defined between the second shoulder main groove 6 and the second tread edge Te2.

Figure 2:
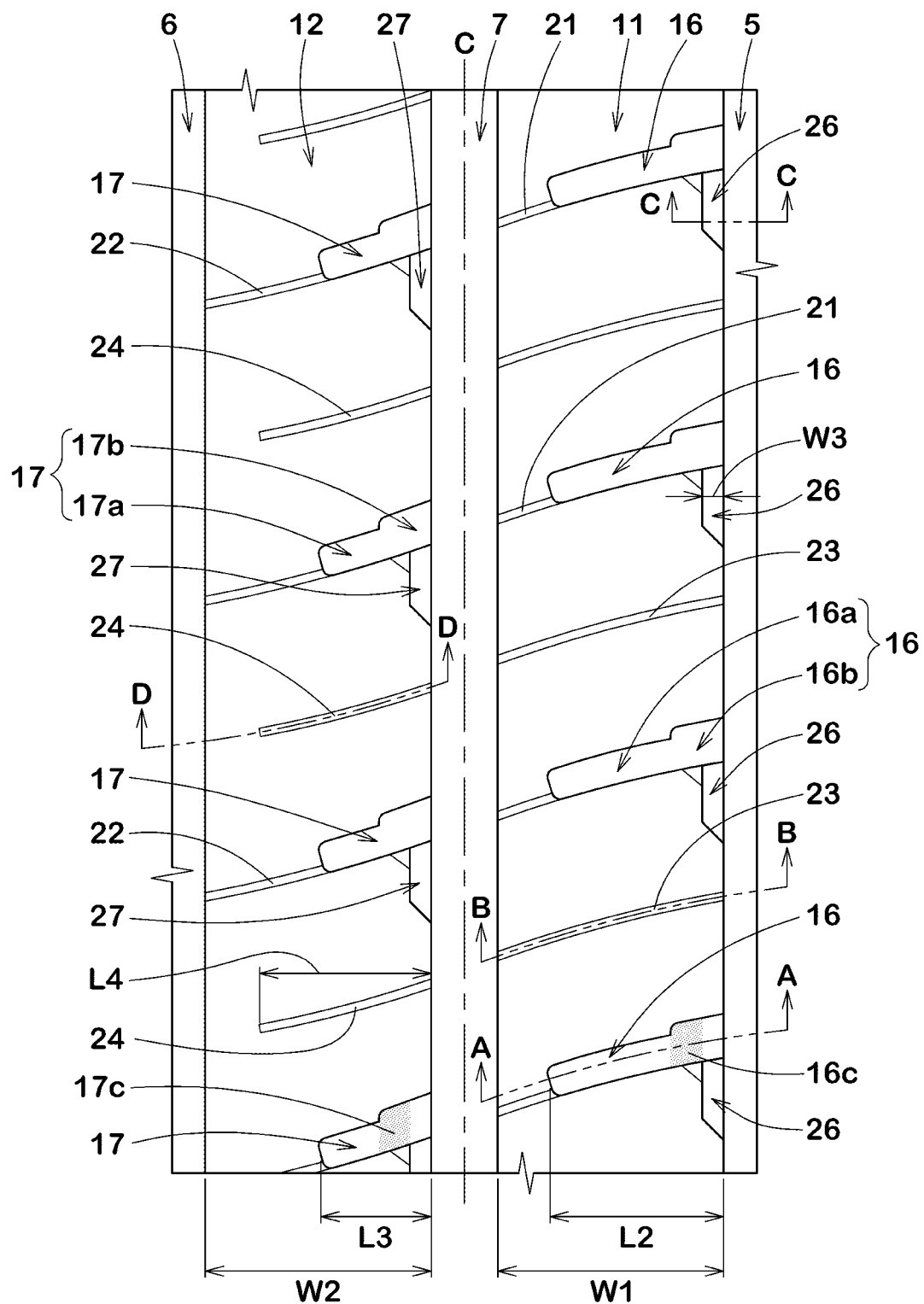
FIG. 2 is an enlarged view of a first middle land portion and a second middle land portion of FIG. 1.

FIG. 2 illustrates an enlarged view of the first middle land portion 11 and the second middle land portion 12. As illustrated in FIG. 2, widths W1 and W2 in the tyre axial direction of the first middle land portion 11 and the second middle land portion 12, respectively, are preferably in a range of from 0.15 to 0.25 the tread width TW. In the present embodiment, the width W1 is equal to the width W2. Note that the present disclosure is not limited to such an aspect.

The first middle land portion 11 is provided with a plurality of first middle lateral grooves 16. The first middle lateral grooves 16 extend from the first shoulder main groove 5 and terminating within the first middle land portion 11. The second middle land portion 12 is provided with a plurality of second middle lateral grooves 17. The second middle lateral grooves 17 extend from the crown main groove 7 and terminate within the second middle land portion 12. As shown in at least FIGS. 1 and 2, each respective first middle lateral groove 16 is preferably aligned with a corresponding respective second middle lateral groove 17 such that a straight imaginary line extending from a first end of the respective first middle lateral groove 16 to a second end of the respective first middle lateral groove 16 further extends through a first end of the respective second middle lateral groove 17 and a second end of the respective second middle lateral groove 17.

When driving on snow, the first middle lateral grooves 16 and the second middle lateral grooves 17 can compress snow and then shear it to generate reaction force, improving on-snow performance. Further, since the first middle lateral grooves 16 and the second middle lateral grooves 17 terminate within the respective land portions, reduction in stiffness of the first middle land portion 11 and the second middle land portion 12 on the second tread edge Te2 side (outboard) can be suppressed. Thus, when cornering on dry road condition such that the center of ground contact surface shifts toward the second tread edge Te2, torsion deformation of the first middle land portion 11 and the second middle land portion 12 can be suppressed, generating large cornering power, thus resulting in superior steering stability.

As illustrated in FIG. 1, the first shoulder land portion 13 is provided with a plurality of first shoulder lateral grooves 18 extending in the tyre axial direction. The second shoulder land portion 14 is provided with a plurality of second shoulder lateral grooves 19 extending in the tyre axial direction. The first shoulder lateral grooves 18 and the second shoulder lateral grooves 19 can generate powerful snow shearing force, improving on-snow performance as with the first middle lateral grooves 16 and the second middle lateral grooves 17.

In the present disclosure, the first middle lateral grooves 16 and the second middle lateral grooves 17 are inclined in a first direction with respect to the tyre axial direction. The first shoulder lateral grooves 18 and the second shoulder lateral grooves 19 are inclined in a second direction opposite to the first direction with respect to the tyre axial direction. This makes it possible to prevent the tread portion 2 from deforming in a specific direction easily, improving steering stability further. In addition, the middle lateral grooves and the shoulder lateral grooves, when driving on snow, can form snow columns with different directions, providing snow shearing force in various directions, resulting in improving on-snow performance further.

In some preferred embodiments, the first shoulder lateral grooves 18 traverse the first shoulder land portion 13 completely. Further, the second shoulder lateral grooves 19 traverse the second shoulder land portion 14 completely. Thus, the first shoulder lateral grooves 18 and the second shoulder lateral grooves 19, when driving on snow, can form laterally long snow columns, improving snow traction further.

The first middle lateral grooves 16, the second middle lateral grooves 17, the first shoulder lateral grooves 18 and the second shoulder lateral grooves 19 are inclined at angles equal to or less than 45 degrees with respect to the tyre axial direction. Such a layout of grooves, when driving on snow, provides superior traction performance. Specifically, it is preferable that the first middle lateral grooves 16 and the second middle lateral grooves 17, for example, are inclined at an angle of from 10 to 20 degrees with respect to the tyre axial direction. It is preferable that the first shoulder lateral grooves 18 and the second shoulder lateral grooves 19 are inclined at an angle of from 5 to 15 degrees with respect to the tyre axial direction.

As illustrated in FIG. 2, the first middle lateral grooves 16, for example, extend so as to traverse the center location in the tyre axial direction of the first middle land portion 11. Specifically, lengths L2 in the tyre axial direction of the first middle lateral grooves 16 are in a range of from 0.70 to 0.90 times the width W1 in the tyre axial direction of the first middle land portion 11. Such first middle lateral grooves 16 can improve steering stability on dry and on-snow performance in a well-balanced manner.

The first middle lateral grooves 16, for example, each include a narrow-width portion 16a having a terminal end within the first middle land portion 11, and a wide-width portion 16b which is connected to the narrow-width portion 16a on the first shoulder main groove 5 side and having a greater width than that of the narrow-width portion 16a. A length in the tyre axial direction of the narrow-width portion 16a, for example, is preferably equal to or more than 0.50 times, more preferably of from 0.60 to 0.80 times the length L2 in the lyre axial direction of the first middle lateral groove 16. Such first middle lateral grooves 16 can improve on-snow performance while maintaining sufficient stiffness of the first middle land portion 11.

Figure 3:
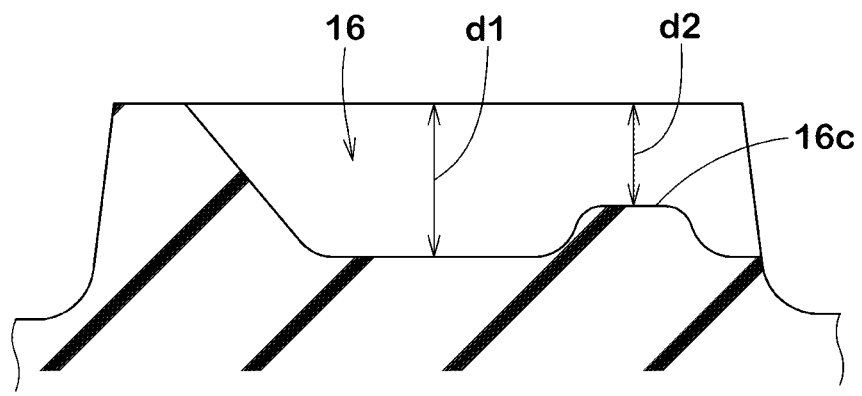
FIG. 3 is a cross-sectional view taken along line A-A of FIG. 2.

FIG. 3 illustrates a cross-sectional view of one of the first middle lateral grooves 16 taken along line A-A of FIG. 2. As illustrated in FIG. 3, it is preferable that at least one of the first middle lateral grooves 16, for example, includes a shallow bottom portion 16c in which a bottom thereof raises outwardly. A depth d2 of the shallow bottom portion 16c, for example, is in a range of from 0.60 to 0.75 times the maximum depth d1 of the first middle lateral groove 16. Such a shallow bottom portion 16c, while maintaining sufficient groove volume, can suppress that the first middle lateral groove 16 opens excessively.

Note that to help understanding the structure of the shallow bottom portion 16c, the shallow bottom portion 16c of one of the first middle lateral grooves 16 is colored in FIG. 2. As illustrated in FIG. 2, the shallow bottom portion 16c, for example, is provided in the wide-width portion 16b. In some preferred embodiments, the shallow bottom portion 16c is provided with a distance from the end of the first middle lateral grooves 16 on the first shoulder main groove 5 side. A length in the lyre axial direction of the shallow bottom portion 16c, for example, may be in a range of from 0.10 to 0.30 times the length L2 in the tyre axial direction of the first middle lateral groove 16.

The first middle land portion 11 is further provided with a plurality of open middle sipes 23 extending from the first shoulder main groove 5 to the crown main groove 7, and a plurality of first connecting sipes 21 extending from the terminal ends of the first middle lateral grooves 16 to the crown main groove 7. As used herein, a "sipe" shall mean an incision having a width of less than 1.5 mm, more preferably 0.5 to 1.0 mm, for example.

The open middle sipes 23 and the first middle lateral grooves 16, for example, are arranged alternately in the tyre circumferential direction. The open middle sipes 23, for example, are inclined in the same direction as the first middle lateral grooves 16 with respect to the tyre axial direction. An angle of the open middle sipes 23 with respect to the tyre axial direction, for example, is in a range of from 10 to 20 degrees.

Figure 4:
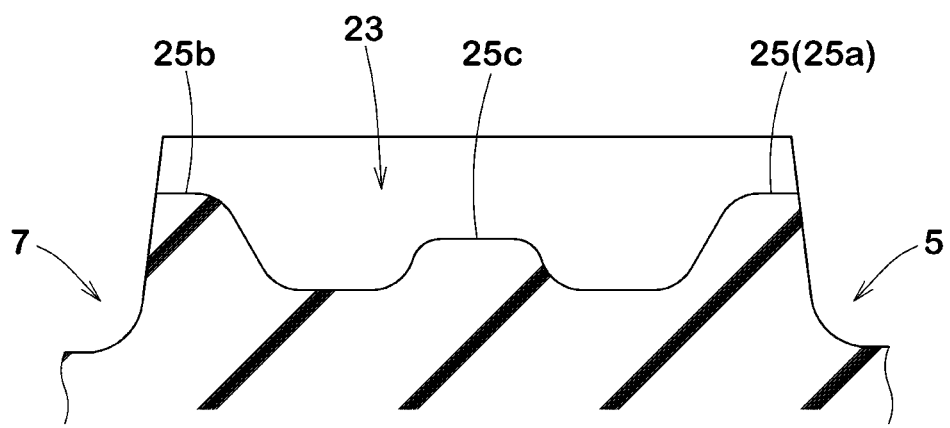
FIG. 4 is a cross-sectional view taken along line B-B of FIG. 2.

FIG. 4 illustrates a cross-sectional view of one of the open middle sipes 23 taken along line B-B of FIG. 2. As illustrated in FIG. 4, some of the open middle sipes 23, for example, each include at least one shallow bottom portion 25 in which a bottom thereof raises. Some of the open middle sipes 23 according to the present embodiment, for example, each include a first shallow-bottom sipe portion 25a provided on one end of the sipe on the first shoulder main groove 5 side, a second shallow-bottom sipe portion 25b provided on the other end of the sipe on the crown main grooves 7 side, and a third shallow-bottom sipe portion 25c provided between the first shallow-bottom sipe portion 25a and the second shallow-bottom sipe portion 25b.

In the present embodiment, the depth of the third shallow-bottom sipe portion 25c is greater than the depth of the first shallow-bottom sipe portion 25a and the depth of the second shallow-bottom sipe portion 25b. In such an open middle sipe 23, since axially both ends thereof are difficult to open as compared with a center portion thereof upon receiving ground contact pressure, excessive deformation of the first middle land portion 11 can be suppressed.

It is preferable that the maximum depth of the open middle sipes 23, for example, is in a range 0.25 to 0.75 times the depth of the crown main groove 7. Such an open middle sipe 23 can improve steering stability on dry road conditions and on-snow performance in a well-balanced manner.

As illustrated in FIG. 2, the first connecting sipes 21, for example, are inclined in the same direction as the first middle lateral grooves 16. The first connecting sipes 21 according to the present embodiment, for example, extend such that one sipe edge of the respective one of first connecting sipe 21 is continuous to one groove edge of the respective one of first middle lateral grooves 16 smoothly.

The first middle land portion 11 is provided with first middle chamfered portions 26 which are recessed on a corner portion between the ground contact surface of the first middle land portion 11 and a land sidewall thereof on the first shoulder main groove 5 side. The first middle chamfered portions 26 are connected to the respective first middle lateral grooves 16. In some preferred embodiments, the respective first middle lateral grooves 16 are connected to the respective first middle chamfered portions 26. In addition, the first middle chamfered portions 26 are connected to the first middle lateral grooves 16 on a first side in the tyre circumferential direction (below in FIG. 2).

In a plan view of the tread portion 2, each first middle chamfered portions 26 according to the present embodiment is provided on an acute angle portion where an angle between the first shoulder main groove 5 and a respective one of first middle lateral grooves 16 is an acute angle. In other words, the first middle lateral grooves 16 are inclined to the first side in the tyre circumferential direction from the first shoulder main groove 5 toward the crown main groove 7, and the respective first middle chamfered portions 26 are connected to the respective first middle lateral grooves 16 on the first side in the tyre circumferential direction.

Figure 5:
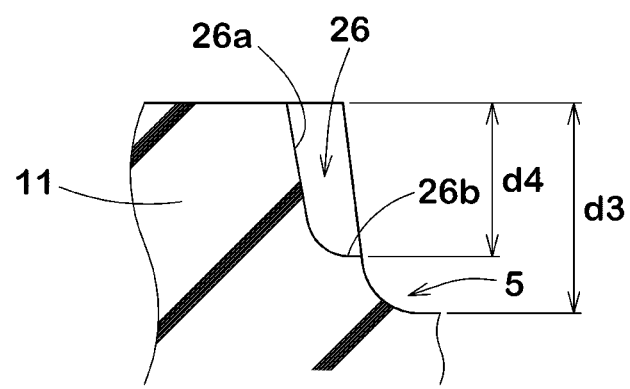
FIG. 5 is a cross-sectional view taken along line C-C of FIG. 2.

FIG. 5 illustrates a cross-sectional view of one of the first middle chamfered portions 26 taken along line C-C of FIG. 2. As illustrated in FIG. 5, the first middle chamfered portions 26 each include a first surface 26a extending along the land sidewall of the first middle land portion 11 and a second surface 26b extending along the ground contact surface of the first middle land portion 11.

It is preferable that the maximum depth d4 of the first middle chamfered portions 26, for example, is in a range of from 0.60 to 0.80 times the depth d3 of the first shoulder main groove 5. The first middle chamfered portions 26 according to the present embodiment, for example, have the same depth as that of the first middle lateral grooves 16. The first middle chamfered portions 26 can be helpful to improve steering stability on dry road conditions and on-snow performance in a well-balanced manner.

As illustrated in FIG. 2, in the same viewpoint, it is preferable a width W3 in the tyre axial direction of each first middle chamfered portion 26, for example, is in a range of from 0.05 to 0.15 times the width W1 in the tyre axial direction of the first middle land portion 11. It is preferable that lengths in the tyre circumferential direction of the first middle chamfered portions 26, for example, are in a range of from 1.5 to 2.5 times the groove widths of the first middle lateral grooves 16.

The first middle land portion 11 is not provided with any grooves that are in communication with the crown main groove 7 directly and that have groove widths equal to or more than 1.5 mm. In addition, the first middle land portion 11, on the crown main groove 7 side thereof, is not provided with any chamfer portions. Such a first middle land portion 11 may have high stiffness on the second tread edge Te2 side thereof, improving steering stability further.

It is preferable that a length L3 in the tyre axial direction of each the second middle lateral groove 17, for example, is smaller than the length L2 in the tyre axial direction of each first middle lateral groove 16. For example, the length L3 of each second middle lateral groove 17 may be in a range of from 0.40 to 0.60 times the width W2 in the tyre axial direction of the second middle land portion 12. Thus, the second middle land portion 12 tends to be difficult to deform as compared with the first middle land portion 11. Such a combination of the first middle land portion 11 and the second middle land portion 12 may provide linear steering response when cornering on dry road conditions in which the center of the ground contact surface shifts to the second tread edge Te2 side.

In some preferred embodiments, the difference between a ratio L2/W1 and a ratio L3/W2, for example, is in a range of from 0.25 to 0.35, where the ratio L2/W1 is a ratio of the length L2 of each first middle lateral groove 16 to the width W1 of the first middle land portion 11, and the ratio L3/W2 is a ratio of the length L3 of each second middle lateral groove 17 to the width W2 of the second middle land portion. Thus, stiffness balance between the first middle land portion 11 and the second middle land portion 12 may be appropriate, improving steering stability on dry road conditions and on-snow performance as well as suppressing uneven wear on the respective land portions.

Each second middle lateral groove 17, for example, includes a narrow-width portion 17a including a terminal end thereof within the second middle land portion 12, and a wide-width portion 17b which is connected to the narrow-width portion 17a at the crown main groove 7 side of the narrow-width portion 17b and which has a greater width than that of the narrow-width portion 17a. It is preferable that a length in the tyre axial direction of the narrow-width portion 17a, for example, is equal to or more than 0.40 times, more preferably in a range of from 0.45 to 0.60 times the length L3 in the tyre axial direction of the second middle lateral grooves 17.

It is preferable that each second middle lateral groove 17, for example, has a shallow bottom portion 17c in which a bottom thereof raises. In FIG. 2, the shallow bottom portion 17c of one of the second middle lateral grooves 17 is colored. The above-mentioned configuration of the shallow bottom portions of first middle lateral grooves 16 can be employed to the shallow bottom portions 17c of second middle lateral grooves 17.

The second middle land portion 12 is provided with a plurality of semi-open middle sipes 24 extending from the crown main groove 7 and terminating within the second middle land portion 12, and a plurality of second connecting sipes 22 extending from the respective terminal ends of the second middle lateral grooves 17 to the second shoulder main groove 6.

For example, the semi-open middle sipes 24 and the second middle lateral grooves 17 are arranged alternately in the tyre circumferential direction. The semi-open middle sipes 24, for example, are inclined in the same direction as the second middle lateral grooves 17 with respect to the tyre axial direction. An angle of the semi-open middle sipes 24 is preferably in a range of from 10 to 20 degrees with respect to the tyre axial direction, for example.

A length L4 in the tyre axial direction of each semi-open middle sipe 24, for example, is greater than the length L3 in the tyre axial direction of the second middle lateral grooves 17. The semi-open middle sipes 24 according to the present embodiment traverse the center location in the tyre axial direction of the second middle land portion 12. Specifically, the length L4 of each semi-open middle sipe 24 is in a range of from 0.50 to 0.90 times the width W2 in the tyre axial direction of the second middle land portion 12. Such semi-open middle sipes 24 can be helpful to improve steering stability and on-snow performance in a well-balanced manner.

Figure 6:
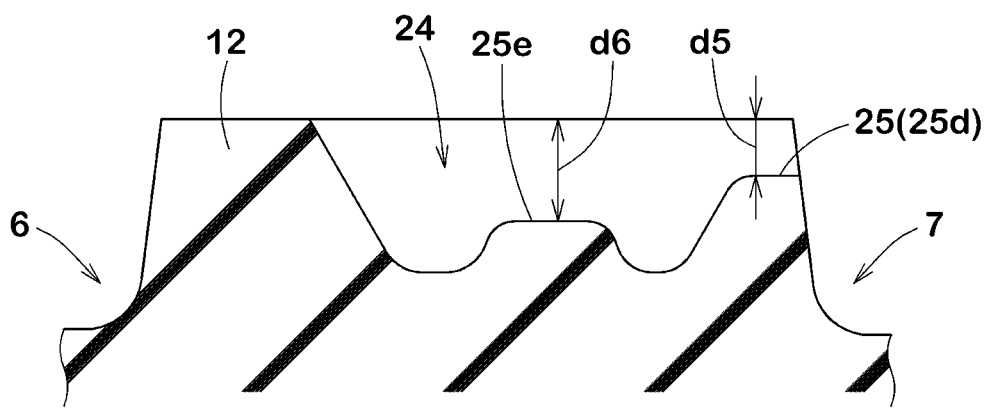
FIG. 6 is a cross-sectional view taken along line D-D of FIG. 2.

FIG. 6 illustrates a cross-sectional view of one of the semi-open middle sipes 24 taken along line D-D of FIG. 2. As illustrated in FIG. 6, the semi-open middle sipes 24, for example, each include a plurality of shallow bottom portions 25 in which respective bottoms thereof raise. Each semi-open middle sipe 24 according to the present embodiment, for example, includes a fourth shallow bottom portion 22d provided on the crown main grooves 7 side and a fifth shallow bottom portion 25e provided between the fourth shallow bottom portion 22d and the terminal end of semi-open middle sipes 24.

In the present embodiment, a depth d6 of the fifth shallow bottom portion 25e is greater than a depth d5 of the fourth shallow bottom portion 25d. Thus, the semi-open middle sipes 24 can suppress deformation of the second middle land portion 12 effectively, helping to improve steering stability.

It is preferable that the maximum depths of semi-open middle sipes 24, for example, is in a range of from 0.25 to 0.75 times the depth of the crown main groove 7.

As illustrated in FIG. 2, the second connecting sipes 22, for example, are inclined in the same direction as the second middle lateral grooves 17. The second connecting sipes 22 according to the present embodiment, for example, extend such that the respective second connecting sipes 22 are continuous to the respective second middle lateral grooves 17 smoothly. In some preferred embodiments, the second connecting sipes 22 may extend such that one of a pair of sipe edges of a respective one of the second connecting sipes 22 is continuous to one of a pair of groove edges of a respective one of the second middle lateral grooves 17 smoothly.

The second middle land portion 12 is provided with second middle chamfered portions 27 which are recessed on a corner portion between the ground contact surface of the second land portion 12 and a land sidewall on the crown main groove 7 side. Each second middle chamfered portion 26 is connected to either one of the second middle lateral grooves 17. In some preferred embodiment, the second middle lateral grooves 17 are connected to the second middle chamfered portions 27. The second middle chamfered portions 27 are connected to the second middle lateral grooves 17 on the first side (below in FIG. 2) in the tyre circumferential direction.

As the configuration of the second middle chamfered portions 27, the configuration of the above-mentioned first middle chamfered portions 26 can be employed, and thus the explanation thereof is omitted herein.

The second middle land portion 12 according to the present embodiment is not provided with any grooves that are in communication with the second shoulder main groove 6 directly and that have groove widths equal to or more than 1.5 mm. In addition, the corner between the ground contact surface and the land sidewall of the second middle land portion 12 on the second shoulder main groove 6 side is not provided with the above-mentioned chamfered portions. Such a second middle land portion 12 has high stiffness on the second tread edge Te2 side, providing linear steering response.

In the present embodiment, by employing the above-mentioned configuration, stiffness in the tyre circumferential direction of the second middle land portion 12 is greater than stiffness in the tyre circumferential direction of the first middle land portion 11. This makes it possible to provide linear steering response when cornering on dry road conditions in which the center of the ground contact surface shifts to the second tread edge Te2 side.

Figure 7:
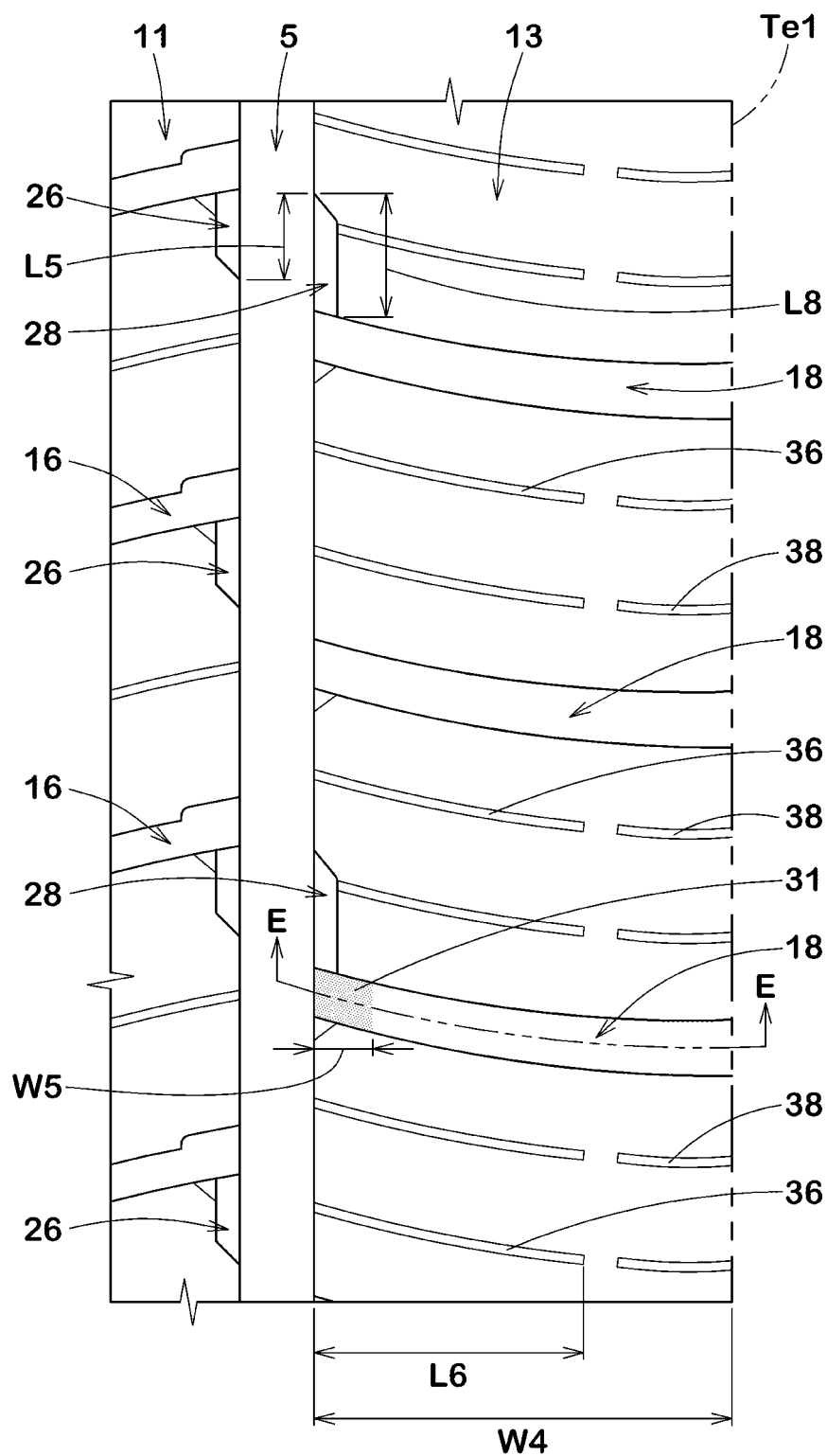
FIG. 7 is an enlarged view of a first shoulder land portion of FIG. 1.

FIG. 7 illustrates an enlarged view of the first shoulder land portion 13. As illustrated in FIG. 7, it is preferable that a width W4 in the tyre axial direction of the first shoulder land portion 13 is in a range of from 1.10 to 1.70 times, more preferably in a range of from 1.10 to 1.40 times the width W1 (shown in FIG. 2) in the tyre axial direction of the first middle land portion 11.

Figure 8:
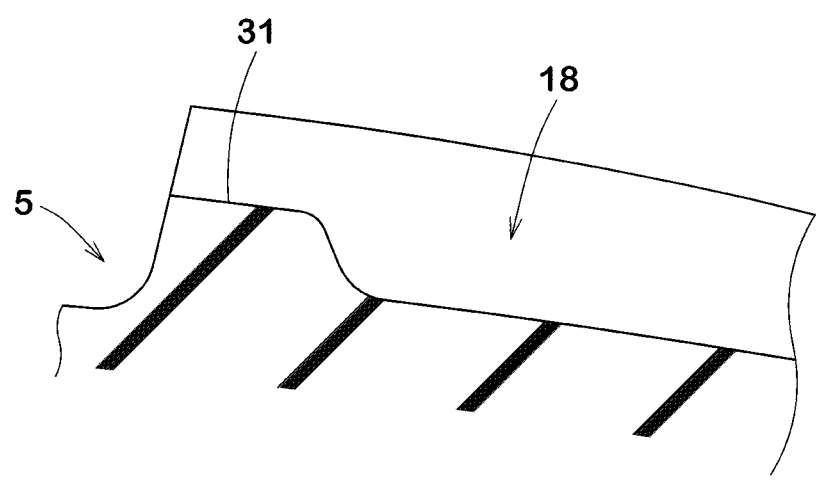
FIG. 8 is a cross-sectional view taken along line E-E of FIG. 7.

FIG. 8 illustrates a cross-sectional view of one of the first shoulder lateral grooves 18 taken along line E-E of FIG. 8. As illustrated in FIG. 8, it is preferable that the first shoulder lateral grooves 18, for example, have first shoulder shallow bottom portions 31 in which bottoms thereof raise. The first shoulder shallow bottom portions 31 according to the present embodiment, for example, are provided on end portions of the first shoulder lateral grooves 18 on the first shoulder main groove 5 side. Thus, the first shoulder shallow bottom portions 31 can be helpful to improve steering stability.

To help understanding the configuration of the first shoulder shallow bottom portions 31, one of them is colored in FIG. 7. As illustrated in FIG. 7, a width W5 in the tyre axial direction of each first shoulder shallow bottom portion 31, for example, is in a range of from 0.10 to 0.20 times the width W4 in the tyre axial direction of the first shoulder land portion 13. The first shoulder shallow bottom portions 31 as such can improve stiffness of the first shoulder land portion 13 while maintaining on-snow performance.

The first shoulder land portion 13 is provided with first shoulder chamfered portions 28 which are recessed on a corner portion between the ground contact surface of the first shoulder land portion 13 and a land sidewall on the first shoulder main groove 5 side. Each first shoulder chamfered portion 26 is connected to either one of the first shoulder lateral grooves 18. The first shoulder chamfered portions 28 are connected to the first shoulder lateral grooves 18 on the second side in the tyre circumferential direction (above in FIG. 7).

As the configuration of the first shoulder chamfered portions 28, the configuration of the above-mentioned first middle chamfered portions 26 can be employed, and thus the explanation thereof is omitted herein.

It is preferable that at least one of the first middle chamfered portions 26, at least partially, faces either one of the first shoulder chamfered portions 28 in the tyre axial direction. This structure makes it possible to enlarge a substantial opening width of the first shoulder main groove 5 partially. Thus, when driving on snow, the enlarged opening width portion can form a larger and harder snow column, resulting in generating powerful snow-shearing force.

It is preferable that a length L5 in the tyre circumferential direction from an end in the tyre circumferential direction of the first middle chamfered portions 26 on the first side to an end in the tyre circumferential direction of the first shoulder chamfered portions 28 on the second side (hereinafter, referred to as an "overlapping length") is in a range of from 0.60 to 0.90 times a length L8 in the tyre circumferential direction of the first shoulder chamfered portion 28. Such an arrangement of the chamfered portions can be helpful to suppress uneven wear of the first middle land portion 11 and the first shoulder land portion 13.

Each first shoulder chamfered portion 28 according to the present embodiment, in a plan view of the tread portion 2, is provided on an acute angle portion where an angle between the first shoulder main groove 5 and a respective one of first shoulder lateral grooves 18 is an acute angle. In other words, the first shoulder lateral grooves 18 are inclined to the first side in the tyre circumferential direction from the first shoulder main groove 5 toward the first tread edge Te1, and the respective first shoulder chamfered portions 28 are connected to the respective first shoulder lateral grooves 18 on the second side in the tyre circumferential direction.

It is preferable that the maximum angle of the first middle lateral groove 16 with respect to the tyre axial direction is greater than the maximum angle of the first shoulder lateral groove 18 with respect to the tyre axial direction. Such a layout of lateral grooves makes it possible that the first middle lateral groove 16 generates snow-shearing force in the tyre axial direction, thus improving cornering performance on snow.

The first shoulder land portion 13 according to the present embodiment is provided with some first shoulder lateral grooves 18 which are connected to the first shoulder chamfered portions 28 and some first shoulder lateral grooves 18 which are not connected to the first shoulder chamfered portions 28, and which are arranged alternately in the tyre circumferential direction. In the present embodiment, the first middle chamfered portions 26 include primary first middle chamfered portions which face the first shoulder chamfered portions 28 and secondary first middle chamfered portions which do not face the first shoulder chamfered portions 28, and the primary first middle chamfered portions and the second first middle chamfered portions are arranged alternately in the tyre circumferential direction Such a layout of chamfered portions makes it possible to suppress excessive reduction of a ground contact surface area of the first shoulder land portion 13 by the first shoulder chamfered portions 28.

The first shoulder land portion 13 according to the present embodiment, for example, is provided with first shoulder sipes 36 and first short sipes 38.

The first shoulder sipes 36, for example, extend from the first shoulder main groove 5 outwardly in the tyre axial direction. The first shoulder sipes 36 according to the present embodiment, for example, terminate within the first shoulder land portion 13. The first shoulder sipes 36 can generate friction force while maintaining sufficient stiffness of the first shoulder land portion 13.

The first shoulder sipes 36, for example, extend along the first shoulder lateral grooves 18. In the present embodiment, the first shoulder sipes 36 extend in parallel with the first shoulder lateral grooves 18. A lengths L6 in the tyre axial direction of the first shoulder sipes 36, for example, is in a range of from 0.55 to 0.75 times the width W4 in the tyre axial direction of the first shoulder land portion 13. Further, the maximum depth of the first shoulder sipes 36, for example, is in a range of from 0.25 to 0.75 times the depth of the first shoulder main groove 5.

It is preferable that at least one of the first shoulder sipes 36 is in communication with either one of the first shoulder chamfered portions 28. Thus, when driving on snow, snow compressed by the first shoulder chamfered portions 28 can be discharged easily when the at least one of the first shoulder sipes 36 opens, exerting superior on-snow performance in a long period.

The first short sipes 38, for example, extend from the first tread edge Te1 and terminating within the first shoulder land portion 13. The respective first short sipes 38 according to the present embodiment, for example, are on extension lines of the respective first shoulder sipes 36. In the present embodiment, gaps having lengths of from 1 to 10 mm are formed between the first shoulder sipes 36 and the first short sipes 38. Such first short sipes 38 generate friction force in cooperation with the first shoulder sipes 36 while maintaining sufficient stiffness of the first shoulder land portion 13.

Figure 9:
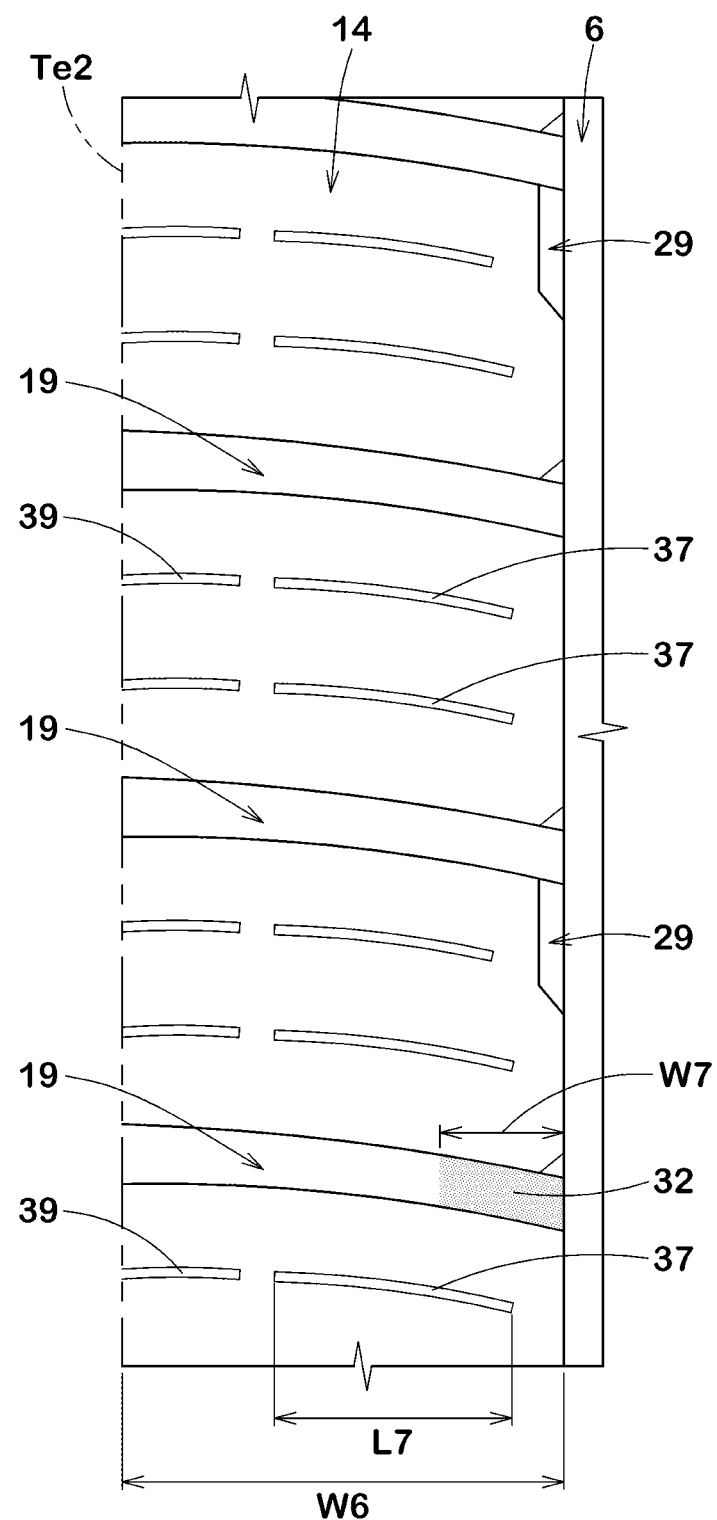
FIG. 9 is an enlarged view of a second shoulder land portion of FIG. 1.

FIG. 9 illustrates an enlarged view of the second shoulder land portion 14. As illustrated in FIG. 9, a width W6 in the tyre axial direction of the second shoulder land portion 14 is preferably in a range of from 1.10 to 1.70 times, more preferably from 1.10 to 1.40 times the width W2 (shown in FIG. 2) in the tyre axial direction of the second middle land portion 12. In the present embodiment, the first shoulder land portion 13 and the second shoulder land portion 14 are formed in the same width with one another.

It is preferable that one or more second shoulder lateral grooves 19, for example, are provided with a second shoulder shallow bottom portion 32 in which a bottom thereof raises. The second shoulder shallow bottom portion 32, except the items which will be described below, has the substantially same configuration as the first shoulder shallow bottom portions 31. Thus, the second shoulder shallow bottom portion 32 can be employed the configuration of the first shoulder shallow bottom portions 31.

In FIG. 9, to help understanding the configuration of the second shoulder shallow bottom portion 32, the second shoulder shallow bottom portion 32 of one of the second shoulder lateral grooves 19 is colored. The second shoulder shallow bottom portion 32, for example, is provided on an end of the second shoulder lateral grooves 19 on the second shoulder main groove 6 side.

It is preferable that a width W7 in the tyre axial direction of the second shoulder shallow bottom portion 32, for example, is greater than the width W5 in the tyre axial direction of the first shoulder shallow bottom portions 31. Specifically, the width W7 of the second shoulder shallow bottom portion 32 is in a range of from 1.5 to 2.5 times the width W5 of the first shoulder shallow bottom portions 31. Such a second shoulder shallow bottom portion 32 can improve stiffness of the second shoulder land portion 14, enabling to exert superior steering stability.

The second shoulder land portion 14 is provided with second shoulder chamfered portions 29 which are recessed on a corner portion between a ground contact surface of the second shoulder land portion 14 and a land sidewall on the second shoulder main groove 6 side. The second shoulder chamfered portions 29 are connected to the respective second shoulder lateral grooves 19. The second shoulder chamfered portions 29 are connected to the respective second shoulder lateral grooves 19 on the first side in the tyre circumferential direction (below in FIG. 9). Such second shoulder chamfered portions 29, when driving on snow, can provide snow-shearing force in cooperation with the second shoulder main groove 6.

The second shoulder chamfered portions 29 have the same cross-section as the first middle chamfered portions 26, and thus the explanation thereof is omitted herein.

The second shoulder lateral grooves 19 includes some second shoulder lateral grooves which are connected to the second shoulder chamfered portions 29 and some second shoulder lateral grooves which are not connected to the second shoulder chamfered portions 29, and which are arranged alternately in the tyre circumferential direction. This makes it possible to suppress excessive reduction of a ground contact surface area of the second shoulder land portion 14 due to the second shoulder chamfered portions 29.

The second shoulder land portion 14 according to the present embodiment, for example, is provided with a plurality of second shoulder sipes 37 and a plurality of the second short sipes 39.

The second shoulder sipes 37, for example, each have both ends that are terminated within the second shoulder land portion 14. It is preferable that the minimum distance from the second shoulder main groove 6 to the respective second shoulder sipes 37, for example, is in a range of from 2 to 20 mm. Preferably, a length L7 in the tyre axial direction of the second shoulder sipes 37, for example, is in a range of from 0.50 to 0.70 times the width W6 in the tyre axial direction of the second shoulder land portion 14. Preferably, the maximum depth of the second shoulder sipes 37, for example, is in a range of from 0.25 to 0.75 times the depth of the second shoulder main groove 6.

The second short sipes 39, for example, extend from the second tread edge Te2 and terminate within the second shoulder land portion 14. The second short sipes 39, for example, are provided on extension lines of the respective second shoulder sipes 37. In the present embodiment, gaps of from 1 to 10 nm are formed between the second shoulder sipes 37 and the second short sipes 39.

In the present embodiment, by employing the above-mentioned structure, stiffness in the tyre circumferential direction of the second shoulder land portion 14 is greater than stiffness in the tyre circumferential direction of the first shoulder land portion 13. Thus, this may provide linear steering response when cornering on dry road condition such that the center of ground contact surface shifts toward the second tread edge Te2. On the contrary, when stiffness in the tyre circumferential direction of the first shoulder land portion 13 is greater than stiffness in the tyre circumferential direction of the second shoulder land portion 14, the tyre may generate less self-aligning torque, deteriorating steering response and steering stability.

While the particularly preferable embodiments in accordance with the present disclosure have been described in detail, the present disclosure is not limited to the illustrated embodiments, but can be modified and carried out in various aspects.

EXAMPLE

Figure 10:
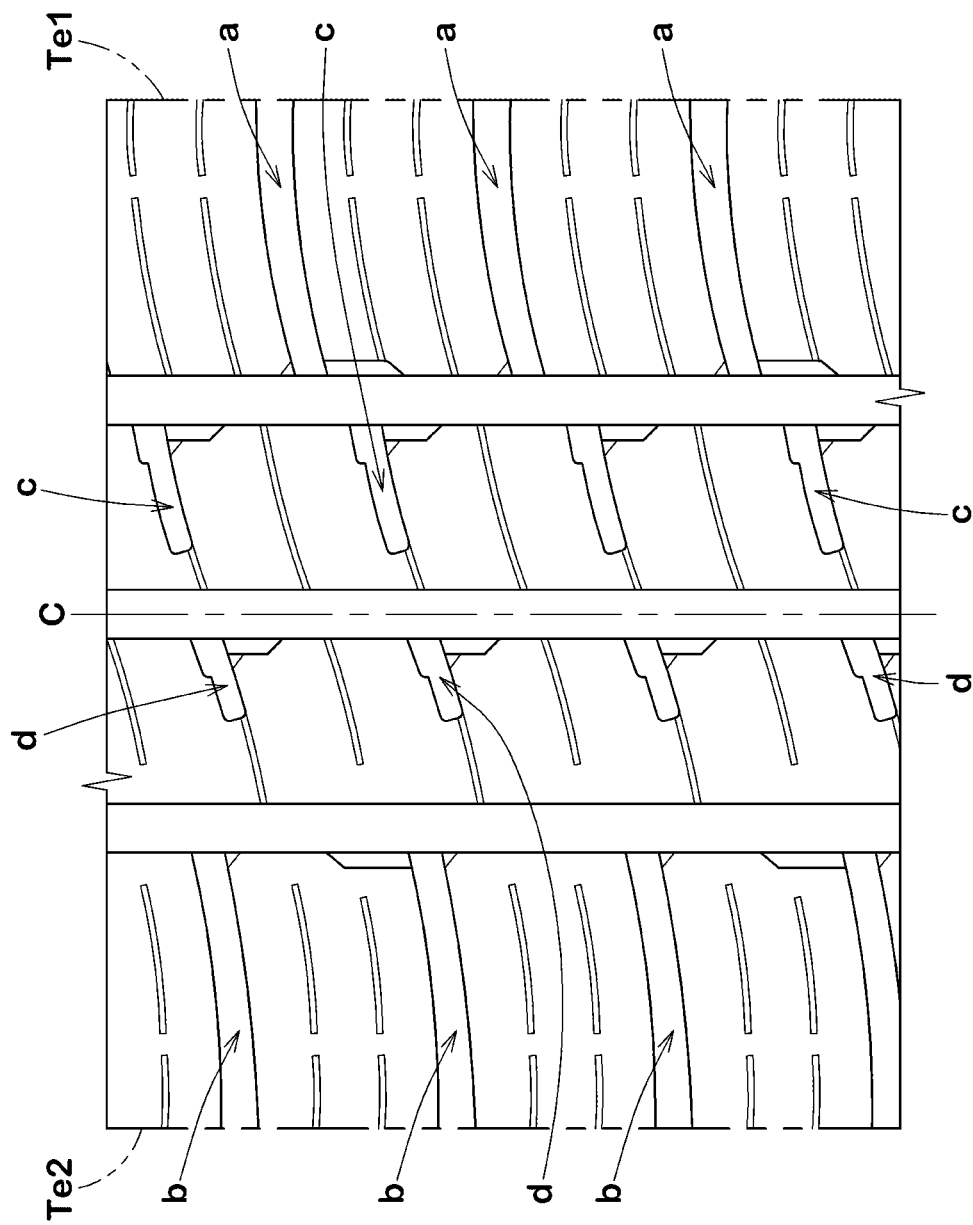
FIG. 10 is a development view of a tread portion of a tyre according to a comparative example.

Tyres 165/65R14 having a basic tread pattern shown in FIG. 1 were manufactured by way of trial based on the detail shown in Table 1. As a comparative example, as illustrated in FIG. 10, a tyre having a tread pattern in which the first shoulder lateral grooves (a) and the second shoulder lateral grooves (b) are inclined in the same direction as the first middle lateral grooves (c) and the second middle lateral grooves (d) was also manufactured by way of trial. Except for the above-mentioned items, the tread pattern of the comparative example is substantially the same as the tread pattern shown in FIG. 1. Then, steering stability on dry road and on-snow performance of each test tyre was tested. The common specification and test procedures are as follows.

Rim size: 14×4.5J

Tyre inner pressure: front 240 kPa, rear 240 kPa

Test vehicle: front wheel drive car with displacement of 1300 cc

Test tyre location: all wheels

Steering Stability on Dry Road Test:

A test driver drove the test vehicle on dry road and then evaluated steering stability of the test tyres by the driver's feeling. The test results are shown in Table 1 using a score where Ref is set to 100. The larger the value, the better the steering stability on dry road is.

On-Snow Performance Test:

A test driver drove the test vehicle on snowy road and then evaluated snow traction, braking performance, and cornering performance of the test tyres by the driver's feeling. The test results are shown in Table 1 using a score where Ref. is set to 100. The larger the value, the better the on-snow performance is.

Table 1 shows the test results.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Tread pattern | FIG. 10 | FIG. 1 | FIG. 1 | FIG. 1 | FIG. 1 | FIG. 1 | FIG. 1 | FIG. 1 | FIG. 1 | FIG. 1 |
| Length L2 of first middle lateral grooves/ width W1 of first middle land portion | 0.77 | 0.77 | 0.70 | 0.75 | 0.85 | 0.90 | 0.77 | 0.77 | 0.77 | 0.77 |
| Lengths L3 of second middle lateral grooves width W2 of second middle land portion | 0.48 | 0.48 | 0.48 | 0.48 | 0.48 | 0.48 | 0.40 | 0.45 | 0.55 | 0.60 |
| Steering stability on dry road (score) | 100 | 106 | 107 | 106 | 104 | 103 | 106 | 106 | 104 | 103 |
| On-snow performance (score) | 100 | 107 | 104 | 106 | 106 | 107 | 106 | 107 | 107 | 107 |

From the test results, it is confirmed that the tyres of examples it prove steering stability on dry road and on-snow performance.

Figure 11:
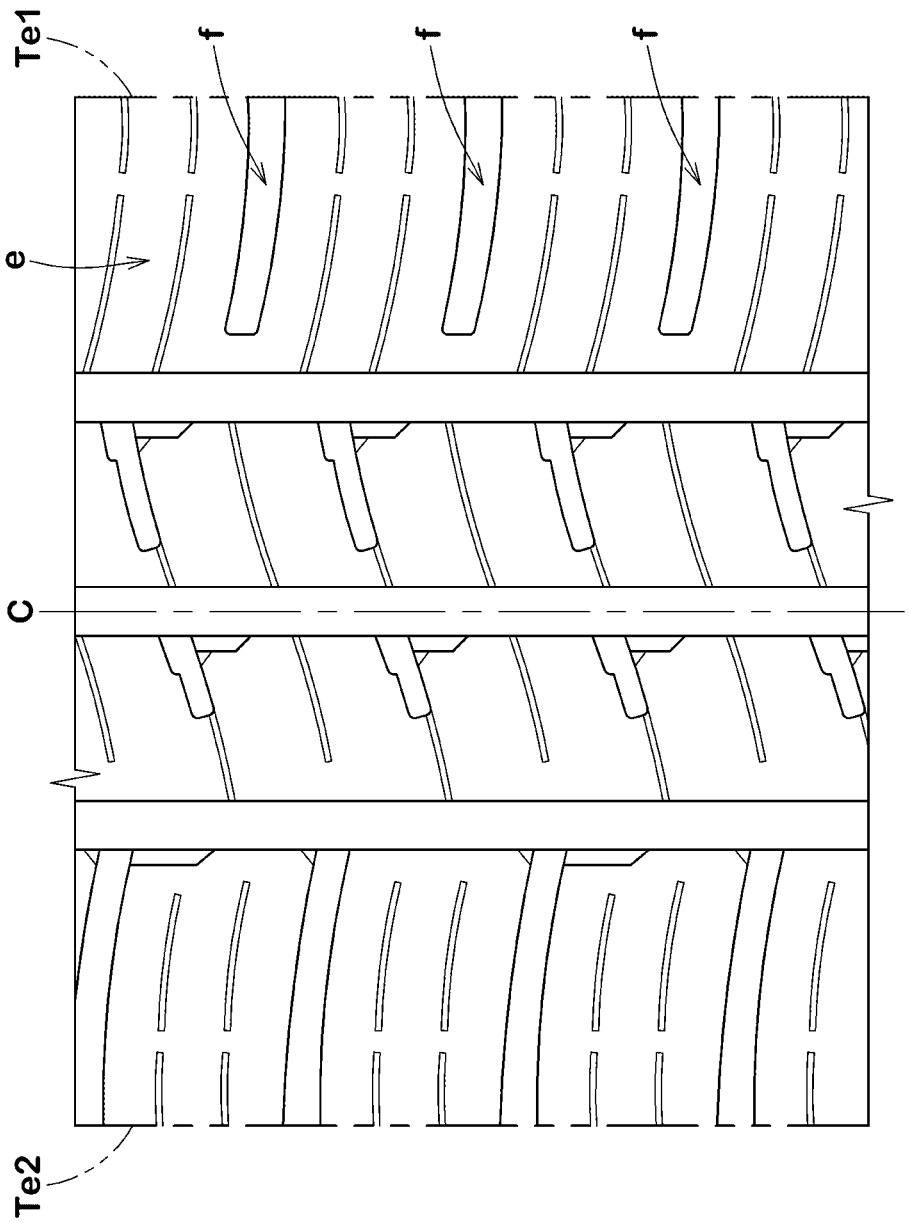
FIG. 11 is a development view of a tread portion of a tyre according to a reference example 1.

Tyres 165/65R14 having a basic tread pattern shown in FIG. 1 were manufactured by way of trial based on the detail shown in Table 2. As a reference example (Ref. 1), as illustrated in FIG. 11, a tyre having the first shoulder land portion (e) provided with lateral grooves (f) which extend from the first tread edge Te1 and terminate within the first shoulder land portion (e) was also manufactured by way of trial. Except for the above-mentioned items, the tread pattern of the tyre of reference example 1 is substantially the same as the tread pattern shown in FIG. 1. Then, steering stability on dry road and on-snow performance of each test tyre was tested. The common specification and test procedures are as described above. Note that in Table 2, the steering stability on dry road and on-snow performance are evaluated using a score where Ref. 1 is set to 100.

Table 2 shows the test results.

TABLE 2

|  | Ref. 1 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Tread pattern | FIG. 11 | FIG. 1 | FIG. 1 | FIG. 1 | FIG. 1 | FIG. 1 | FIG. 1 | FIG. 1 | FIG. 1 | FIG. 1 |
| Lengths L2 of first middle lateral grooves/ width W1 of first middle land portion | 0.77 | 0.77 | 0.70 | 0.75 | 0.85 | 0.90 | 0.77 | 0.77 | 0.77 | 0.77 |
| Length L3 of second middle lateral grooves/ width W2 of second middle land portion | 0.48 | 0.48 | 0.48 | 0.48 | 0.48 | 0.48 | 0.40 | 0.45 | 0.55 | 0.60 |
| Steering stability on dry road (score) | 100 | 103 | 103 | 103 | 102 | 101 | 105 | 104 | 102 | 101 |
| On-snow performance (score) | 100 | 106 | 104 | 106 | 106 | 107 | 104 | 105 | 106 | 106 |

From the test results, it is confirmed that the tyres of examples improve steering stability on dry road and on-snow performance.

Figure 12:
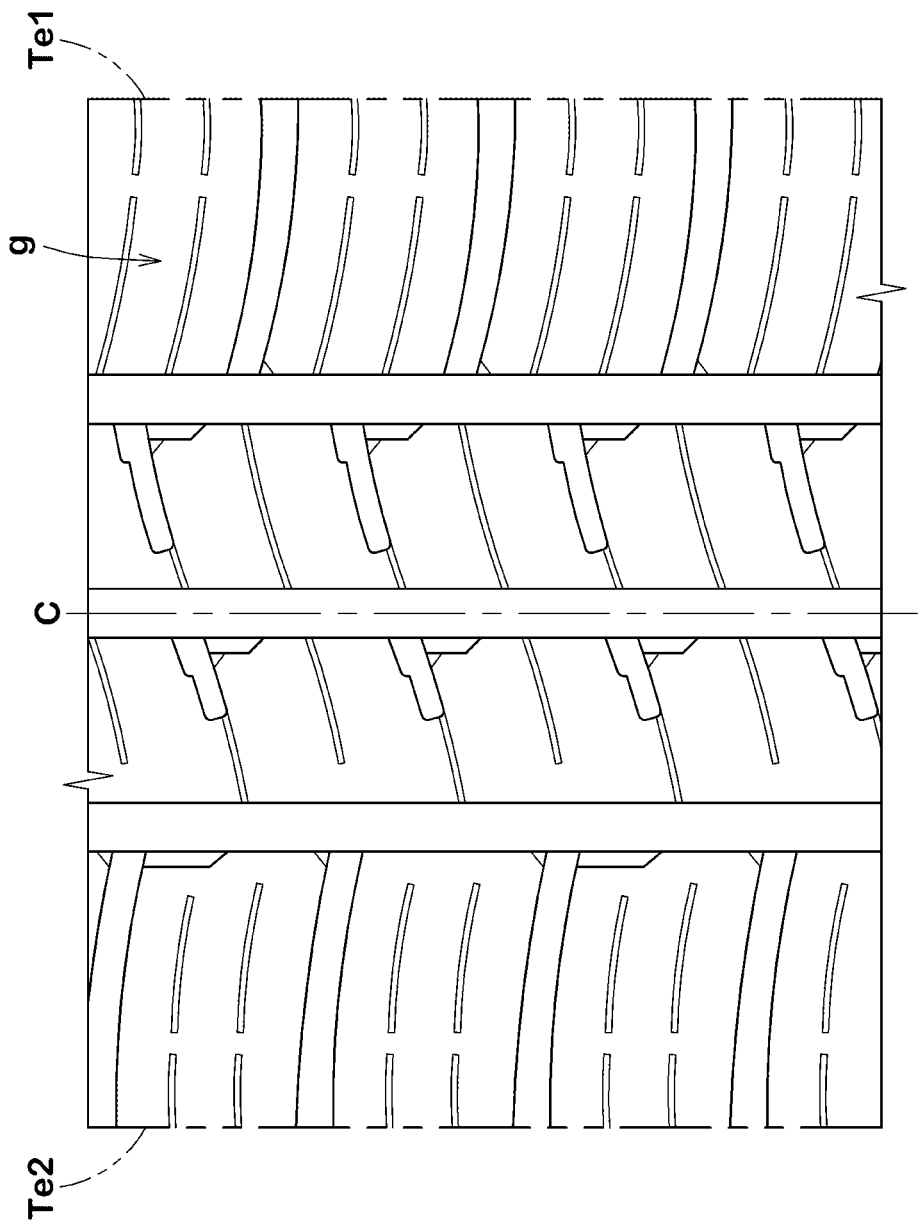
FIG. 12 is a development view of a tread portion of a tyre according to a reference example 2.

Tyres 165/65R14 having a basic tread pattern shown in FIG. 1 were manufactured by way of trial based on the detail shown in Table 3. As a reference example 2 (Ref. 2), as illustrated in FIG. 12, a tyre having the first shoulder land portion (g) which is not provided with chamfered portion was also manufactured by way of trial. Except for the above-mentioned items, the tread pattern of the tyre of reference example 2 is substantially the same as the tread pattern shown in FIG. 1. Then, steering stability on dry road and on-snow performance of each test tyre was tested. The common specification and test procedures are as described above. Note that in Table 3, the steering stability on dry road and on-snow performance are evaluated using a score where the Ref. 2 is set to 100.

Table 2 shows the test results.

TABLE 3

|  | Ref. 2 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| Tread pattern | FIG. 12 | FIG. 1 | FIG. 1 | FIG. 1 | FIG. 1 | FIG. 1 | FIG. 1 | FIG. 1 | FIG. 1 |
| Overlapping length L5/length L8 of first shoulder chamfered portions | — | 0.68 | 0.60 | 0.65 | 0.75 | 0.80 | 0.90 | 0.68 | 0.68 |
| Widths W3 of first middle chamfered portions/width W1 of first middle land portion | 0.09 | 0.09 | 0.09 | 0.09 | 0.09 | 0.09 | 0.09 | 0.05 | 0.15 |
| Steering stability on dry road (score) | 100 | 102 | 102 | 102 | 102 | 101 | 101 | 102 | 101 |
| On-snow performance (score) | 100 | 108 | 106 | 107 | 108 | 108 | 108 | 106 | 108 |

From the test results, it is confirmed that the tyres of examples improve steering stability on dry road and on-snow performance.

What is claimed is:

1. A tyre comprising
a tread portion having a designated mounting direction to a vehicle, the tread portion comprising:
a first tread edge located inwardly of a vehicle when being mounted to the vehicle;
a second tread edge located outwardly of a vehicle when being mounted to the vehicle;
circumferentially and continuously extending main grooves arranged between the first tread edge and the second tread edge, the main grooves comprising a first shoulder main groove arranged between the first tread edge and a tyre equator, a second shoulder main groove arranged between the second tread edge and the tyre equator, and at least one crown main groove arranged between the first shoulder main groove and the second shoulder main groove; and
land portions divided by the main grooves, the land portions comprising a first middle land portion defined between the first shoulder main groove and the at least one crown main groove, a second middle land portion defined between the second shoulder main groove and the at least one crown main groove, a first shoulder land portion defined between the first shoulder main groove and the first tread edge, and a second shoulder land portion defined between the second shoulder main groove and the second tread edge,
wherein the first middle land portion is provided with first middle lateral grooves extending from the first shoulder main groove and terminating within the first middle land portion,
wherein the second middle land portion is provided with second middle lateral grooves extending from the at least one crown main groove and terminating within the second middle land portion,
wherein the first shoulder land portion is provided with first shoulder lateral grooves extending in a tyre axial direction,
wherein the second shoulder land portion is provided with second shoulder lateral grooves extending in the tyre axial direction,
wherein the first middle lateral grooves and the second middle lateral grooves are inclined in a first direction with respect to the tyre axial direction,
wherein the first shoulder lateral grooves and the second shoulder lateral grooves are inclined in a second direction opposite to the first direction with respect to the tyre axial direction,
wherein the tread portion is provided with only three main grooves as circumferential and continuously extending main grooves,
wherein the first middle land portion is provided with first middle chamfered portions which are recessed on a corner portion between a ground contact surface of the first middle land portion and a land sidewall of the first middle land portion on the first shoulder main groove side,
wherein the first middle chamfered portions are connected to the respective first middle lateral grooves,
wherein the first shoulder lateral grooves extend from the first shoulder main groove,
wherein the first shoulder land portion is provided with first shoulder chamfered portions which are recessed on a corner portion between a ground contact surface of the first shoulder land portion and a land sidewall of the first shoulder land portion on the first shoulder main groove side,
wherein the first shoulder chamfered portions are connected to the respective first shoulder lateral grooves,
wherein an entire region of at least one of the first middle chamfered portions faces one of the first shoulder chamfered portions in the tyre axial direction,
wherein the at least one of the first middle chamfered portions is entirely overlapped by the one of the first shoulder chamfered portions in the tyre axial direction, and wherein the at least one of the first middle chamfered portions is smaller than the one of the first shoulder chamfered portions in a tyre circumferential direction.

2. The tyre according to claim 1, wherein lengths in the tyre axial direction of the first middle lateral grooves are in a range of from 0.70 to 0.90 times a width in the tyre axial direction of the first middle land portion.

3. The tyre according to claim 1, wherein lengths in the tyre axial direction of the second middle lateral grooves are in a range of from 0.40 to 0.60 times a width in the tyre axial direction of the second middle land portion.

4. The tyre according to claim 1, wherein a width in the tyre axial direction of the first shoulder land portion is in a range of from 1.10 to 1.40 times a width in the tyre axial direction of the first middle land portion.

5. The tyre according to claim 1, wherein the first middle lateral grooves, the second middle lateral grooves, the first shoulder lateral grooves and the second shoulder lateral grooves are inclined at angles equal to or less than 45 degrees with respect to the tyre axial direction.

6. The tyre according to claim 1, wherein the first middle land portion is not provided with any grooves that are in communication with the at least one crown main groove directly and that have groove widths equal to or more than 1.5 mm.

7. The tyre according to claim 1, wherein the second middle land portion is not provided with any grooves that are in communication with the second shoulder main groove directly and that have groove widths equal to or more than 1.5 mm.

8. The tyre according to claim 1, wherein the first shoulder lateral grooves traverse the first shoulder land portion completely, and wherein the second shoulder lateral grooves traverse the second shoulder land portion completely.

9. The tyre according to claim 1, wherein the second middle land portion is provided with semi-open middle sipes extending from the at least one crown main groove and terminating within the second middle land portion.

10. The tyre according to claim 1, wherein the first middle land portion is provided with open middle sipes extending from the first shoulder main groove to the at least one crown main groove.

11. The tyre according to claim 1, wherein the first shoulder land portion is provided with first shoulder sipes extending outwardly in the tyre axial direction from the first shoulder main groove.

12. The tyre according to claim 1, wherein the second shoulder land portion is provided with second shoulder sipes having both ends terminating within the second shoulder land portion.

13. The tyre according to claim 1, wherein the stiffness in the tyre circumferential direction of the second middle land portion is greater than the stiffness in the tyre circumferential direction of the first middle land portion.

14. The tyre according to claim 1, wherein the first middle chamfered portions are connected to the respective first middle lateral grooves on a first side in the tyre circumferential direction, and wherein the first shoulder chamfered portions are connected to the first shoulder lateral grooves on a second side in the tyre circumferential direction.

15. The tyre according to claim 1, wherein a maximum angle of the first middle lateral grooves with respect to the tyre axial direction is greater than a maximum angle of the first shoulder lateral grooves with respect to the tyre axial direction.

16. The tyre according to claim 1, wherein the first middle chamfered portions comprise primary first middle chamfered portions which face the first shoulder chamfered portions and secondary first middle chamfered portions which do not face the first shoulder chamfered portions, and wherein the primary first middle chamfered portions and the secondary first middle chamfered portions are arranged alternately in the tyre circumferential direction.

17. The tyre according to claim 1, wherein the first shoulder lateral grooves comprise some first shoulder lateral grooves which are connected to the first shoulder chamfered portions and some first shoulder lateral grooves which are not connected to the first shoulder chamfered portions, and which are arranged alternately in the tyre circumferential direction.

18. The tyre according to claim 1, wherein each respective first middle lateral groove is aligned with a corresponding respective second middle lateral groove such that a straight imaginary line extending from a first end of the respective first middle lateral groove to a second end of the respective first middle lateral groove further extends through a first end of the respective second middle lateral groove and a second end of the respective second middle lateral groove, the first end of the respective first middle lateral groove faces the first shoulder main groove, the second end of the respective first middle lateral groove is closer to the at least one crown main groove than the first end of the respective first middle lateral groove, the first end of the respective second middle lateral groove faces the at least one crown main groove, and the second end of the respective second middle lateral groove is closer to the second shoulder main groove than the first end of the respective second middle lateral groove.

* * * * *